United States Patent
Liu et al.

(10) Patent No.: US 11,381,365 B2
(45) Date of Patent: Jul. 5, 2022

(54) COLLISION OF SOUNDING REFERENCE SIGNAL (SRS) AND PHYSICAL UPLINK SHARED CHANNEL (PUSCH) IN CASE OF CARRIER AGGREGATION

(71) Applicant: QUALCOMM Incorporated, San Diego, CA (US)

(72) Inventors: Le Liu, Fremont, CA (US); Alberto Rico Alvarino, San Diego, CA (US); Alexandros Manolakos, San Diego, CA (US); Prashanth Akula, Lake Bluff, IL (US); Supratik Bhattacharjee, San Diego, CA (US); Qiang Shen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 93 days.

(21) Appl. No.: 16/737,862

(22) Filed: Jan. 8, 2020

(65) Prior Publication Data

US 2020/0221311 A1 Jul. 9, 2020

(30) Foreign Application Priority Data

Jan. 9, 2019 (GR) .............................. 20190100010

(51) Int. Cl.
*H04L 5/00* (2006.01)
*H04W 72/04* (2009.01)
(Continued)

(52) U.S. Cl.
CPC ............ *H04L 5/0053* (2013.01); *H04L 5/001* (2013.01); *H04L 5/0091* (2013.01);
(Continued)

(58) Field of Classification Search
CPC ..... H04L 5/001; H04L 5/0048; H04L 5/0053; H04L 5/0091; H04W 52/146; H04W 52/325; H04W 72/0413; H04W 72/0046
See application file for complete search history.

(56) References Cited

U.S. PATENT DOCUMENTS

2012/0039273 A1* 2/2012 Nam .................. H04L 5/0005
370/329
2013/0215811 A1 8/2013 Takaoka et al.
(Continued)

FOREIGN PATENT DOCUMENTS

EP 2536050 A2 12/2012

OTHER PUBLICATIONS

Huawei, et al., "Remaining Details for Uplink Power Control with CA," 3GPP Draft, 3GPP TSG RAN WG1 Meeting #92, R1-1801808, 3RD Generation Partnership Project (3GPP), Mobile Competence Centre, 650, Route Des Lucioles, F-06921, Sophia-Antipolis Cedex, France, vol. RAN WG1. No. Athens, Greece, Feb. 26, 2018-Mar. 2, 2018, Feb. 16, 2018 (Feb. 16, 2018), XP051397431, pp. 1-6, Retrieved from the Internet: URL: http://www.3gpp.org/ftp/tsg%5Fran/WG1%5FRL1/TSGR1%5F92/Docs/ [retrieved on Feb. 16, 2018] section 2.1.
(Continued)

*Primary Examiner* — Kevin C. Harper
(74) *Attorney, Agent, or Firm* — Patterson + Sheridan, L.L.P.

(57) ABSTRACT

Certain aspects of the present disclosure provide techniques for handling collisions between PUSCH and sounding reference signal (SRS) on additional SRS symbols in an uplink subframe using carrier aggregation. The techniques provide rules that a user equipment (UE) may apply to decide if and when to drop or apply power scaling to SRS or PUSCH transmissions scheduled on overlapping time resources.

23 Claims, 15 Drawing Sheets

(51) Int. Cl.
*H04W 52/14* (2009.01)
*H04W 52/32* (2009.01)
*H04W 16/14* (2009.01)
*H04L 27/26* (2006.01)

(52) U.S. Cl.
CPC ....... *H04W 52/146* (2013.01); *H04W 52/325* (2013.01); *H04W 72/0413* (2013.01); *H04W 72/0446* (2013.01); *H04L 5/0048* (2013.01); *H04L 27/2691* (2013.01); *H04W 16/14* (2013.01)

(56) References Cited

U.S. PATENT DOCUMENTS

| | | | | |
|---|---|---|---|---|
| 2013/0272229 A1* | 10/2013 | Dinan | ....................... | H04L 5/14 370/329 |
| 2014/0293947 A1* | 10/2014 | Nishikawa | ........ | H04W 72/1257 370/329 |
| 2015/0036566 A1* | 2/2015 | Blankenship | ....... | H04W 52/367 370/311 |
| 2016/0254892 A1* | 9/2016 | Kim | .......................... | H04L 5/14 370/280 |
| 2018/0006788 A1* | 1/2018 | Lee | ....................... | H04L 5/0051 |
| 2019/0159080 A1* | 5/2019 | Zhang | ..................... | H04W 8/22 |
| 2019/0320396 A1* | 10/2019 | Bagheri | .............. | H04W 52/146 |

OTHER PUBLICATIONS

International Search Report and Written Opinion—PCT/US2020/012842—ISA/EPO—dated Apr. 7, 2020.
Qualcomm Incorporated: "Summary of Remaining Issues for Overlapping UL Transmissions", 3GPP Draft, 3GPP TSG RAN WG1 Meeting #93, R1-1807820 Summary of Remaining Issues for Overlapping UL Transmissions VERSION 7, 3rd Generation Partnership Project (3GPP), Mobile Competence Centre, 650, Route Des Lucioles, F-06921 Sophia-Antipolis Cedex, France, vol. RAN WG1, No. 3rd Generation Partnership Project (3GPP), Mobile Competence Centre, 650, Route Des Lucioles, F-06921 Sophia-Antipolis Cedex, France, vol. RAN WG1, No. Busan, Korea; May 21, 2018-May 25, 2018 May 24, 2018, XP051463428, 15 pages, Retrieved from the Internet:URL:http://www.3gpp.org/ftp/tsg%5Fran/WG1%5FRL1/TSGR1%5F93/Docs [retrieved on May 24, 2018].

* cited by examiner

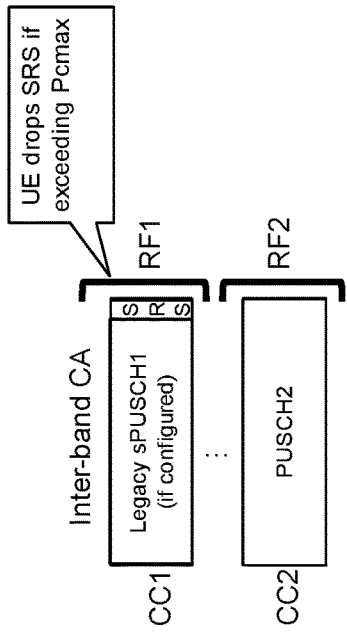
FIG. 7A
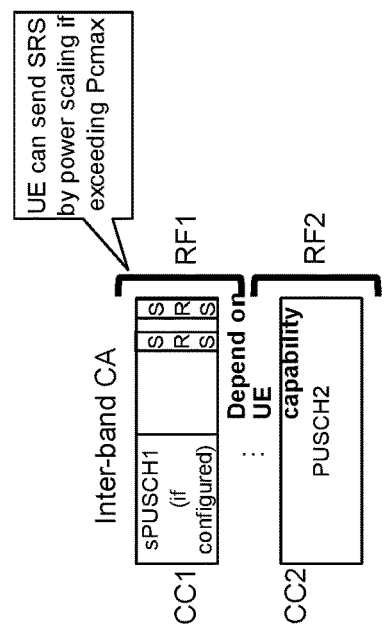
FIG. 7B
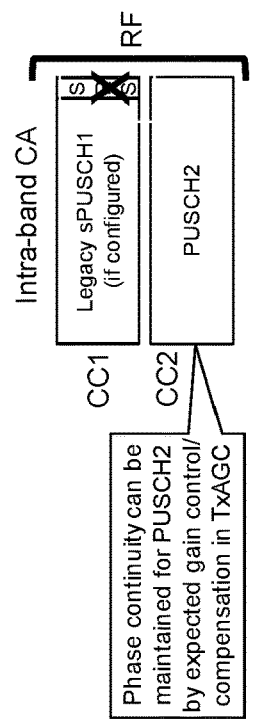

COLLISION OF SOUNDING REFERENCE SIGNAL (SRS) AND PHYSICAL UPLINK SHARED CHANNEL (PUSCH) IN CASE OF CARRIER AGGREGATION

PRIORITY CLAIM(S)

This application claims priority to and the benefit of Greek Patent Application No. 20190100010, filed on Jan. 9, 2019, which is expressly incorporated by reference in its entirety as if fully set forth below and for all applicable purposes.

FIELD OF THE DISCLOSURE

Aspects of the present disclosure relate to wireless communications, and more particularly, to techniques for collision handling for sounding reference signal (SRS) and physical uplink shared channel (PUSCH) transmissions scheduled on different component carriers (CCs) in a same subframe.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment in a network. The method generally includes receiving, from the network, signaling indicating, for a set of one or more uplink subframes, a first configuration for transmitting zero or more sounding reference signal (SRS) transmissions of a first type in a first component carrier (CC) and a second configuration for transmitting zero or more SRS transmission of a second type in the first CC, detecting, based on the configuration, a potential collision in the time domain of a subframe between one or more SRS transmissions in the first CC and a scheduled physical uplink shared channel (PUSCH) transmission in a second CC, determining whether to drop or apply power scaling to at least one of the SRS transmissions or the PUSCH transmission based on at least one of a transmission type, symbol number, symbol location, or allocated power of the SRS transmissions or PUSCH transmission, and transmitting at least one of the PUSCH transmission or SRS transmissions in accordance with the determination.

Certain aspects provide a method for wireless communications by a base station (BS). The method generally includes transmitting signaling indicating, for a set of one or more uplink subframes, a first configuration for transmitting zero or more sounding reference signal (SRS) transmissions of a first type in a first component carrier (CC) and a second configuration for transmitting zero or more SRS transmission of a second type in the first CC, detecting, based on the configuration, a potential collision in the time domain of a subframe between one or more SRS transmissions in the first CC and a scheduled physical uplink shared channel (PUSCH) transmission in a second CC, determining whether the UE is to drop or apply power scaling to at least one of the SRS transmissions or the PUSCH transmission based on at least one of a transmission type, symbol number, symbol location, or allocated power of the SRS transmissions or PUSCH transmission, and processing at least one of the PUSCH transmission or SRS transmissions in accordance with the determination.

Certain aspects of the present disclosure also provide various apparatus, means, and computer readable medium configured to perform (or cause a processor to perform) the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 7A and 7B illustrate examples of subframes with SRS and PUSCH transmissions on overlapping (colliding) resources.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
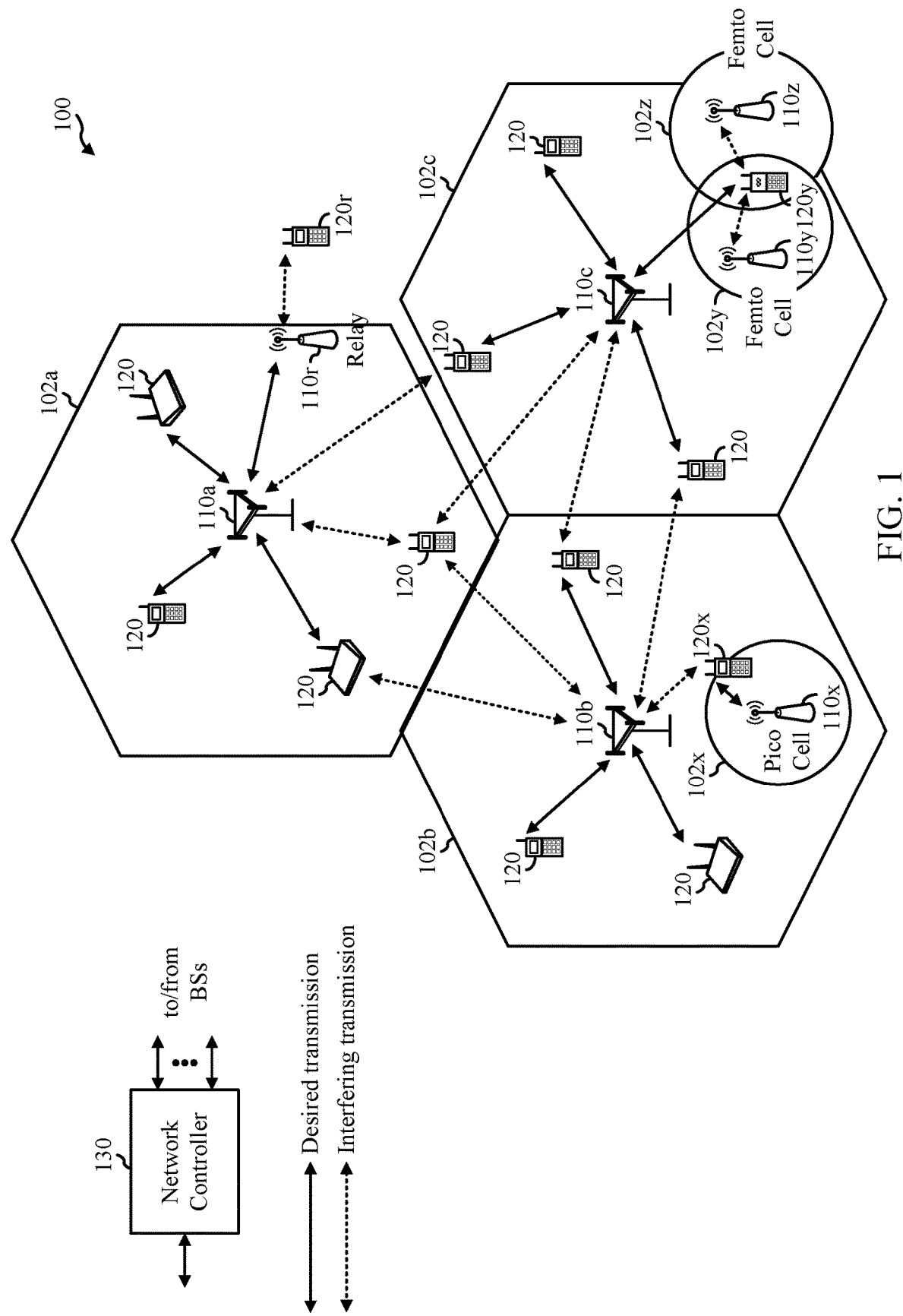
FIG. 1 is a block diagram conceptually illustrating an example telecommunications system, in accordance with certain aspects of the present disclosure.

Aspects of the present disclosure relate to wireless communications, and more particularly, to techniques for collision handling for sounding reference signal (SRS) and physical uplink shared channel (PUSCH) transmissions scheduled on different component carriers (CCs) in a same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 and network entities (such as BSs 110) may be configured to handle collisions between SRS and PUSCH transmissions using techniques described herein with reference to FIGS. 9 and 10, respectively.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., abase station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
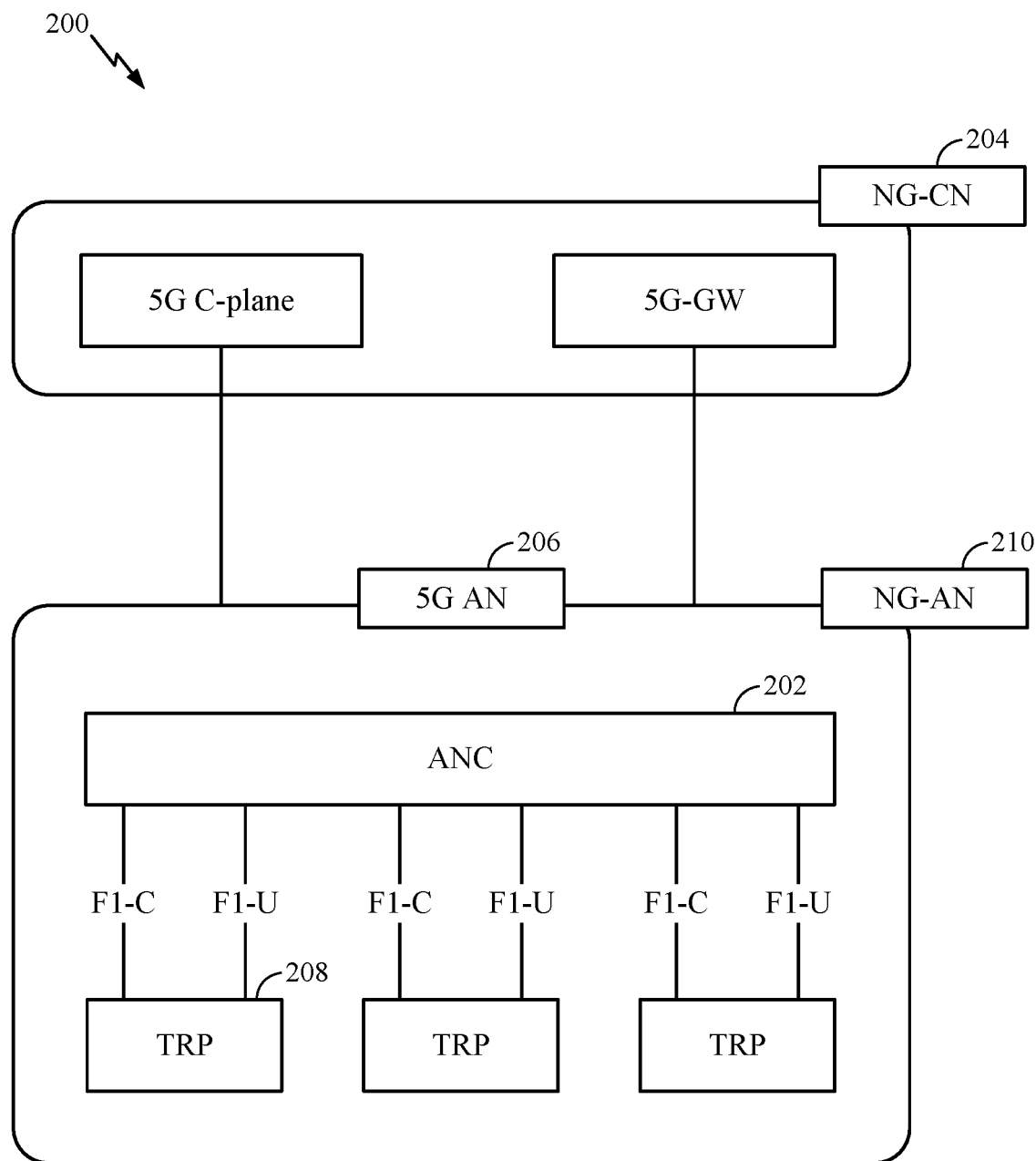
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support front hauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
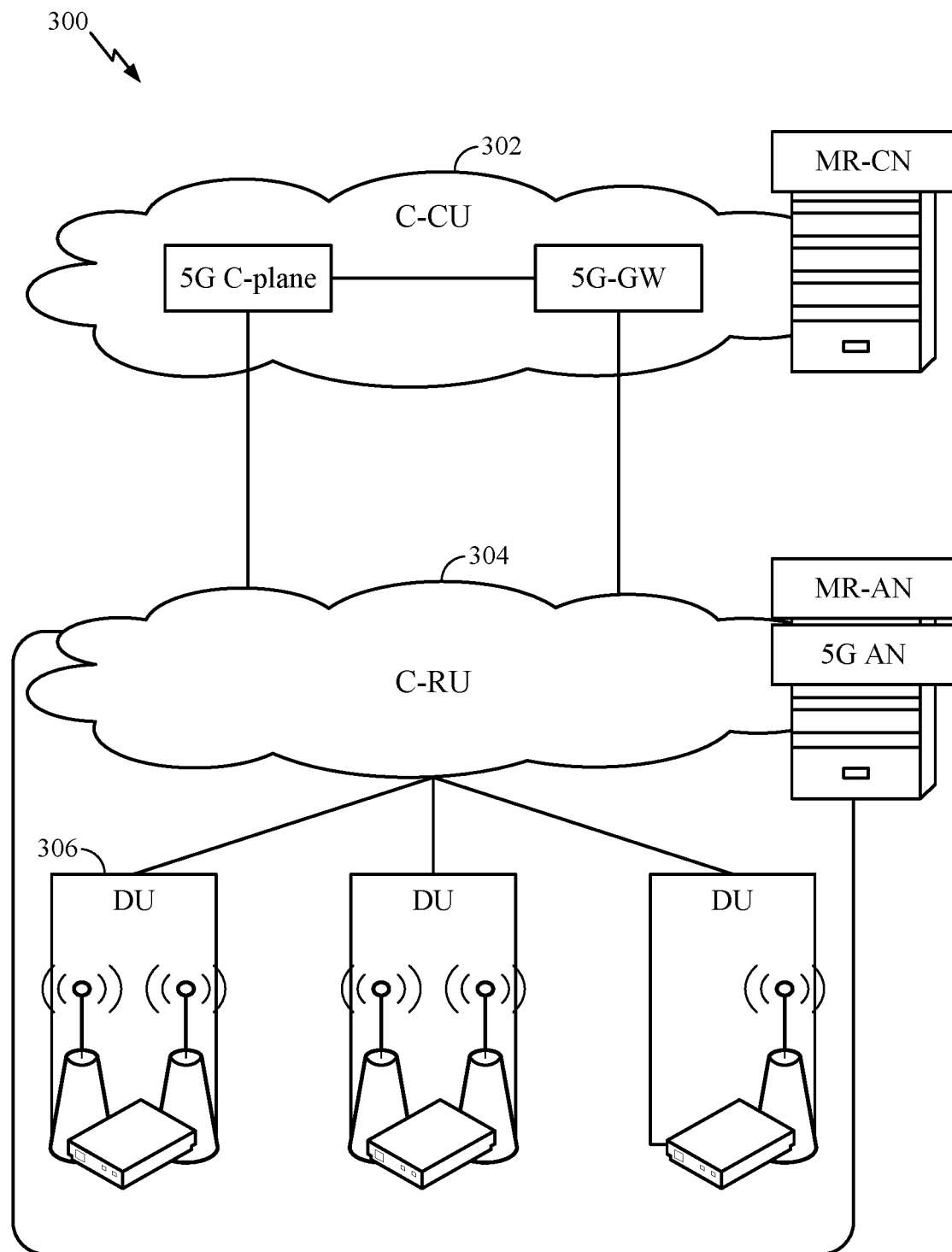
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
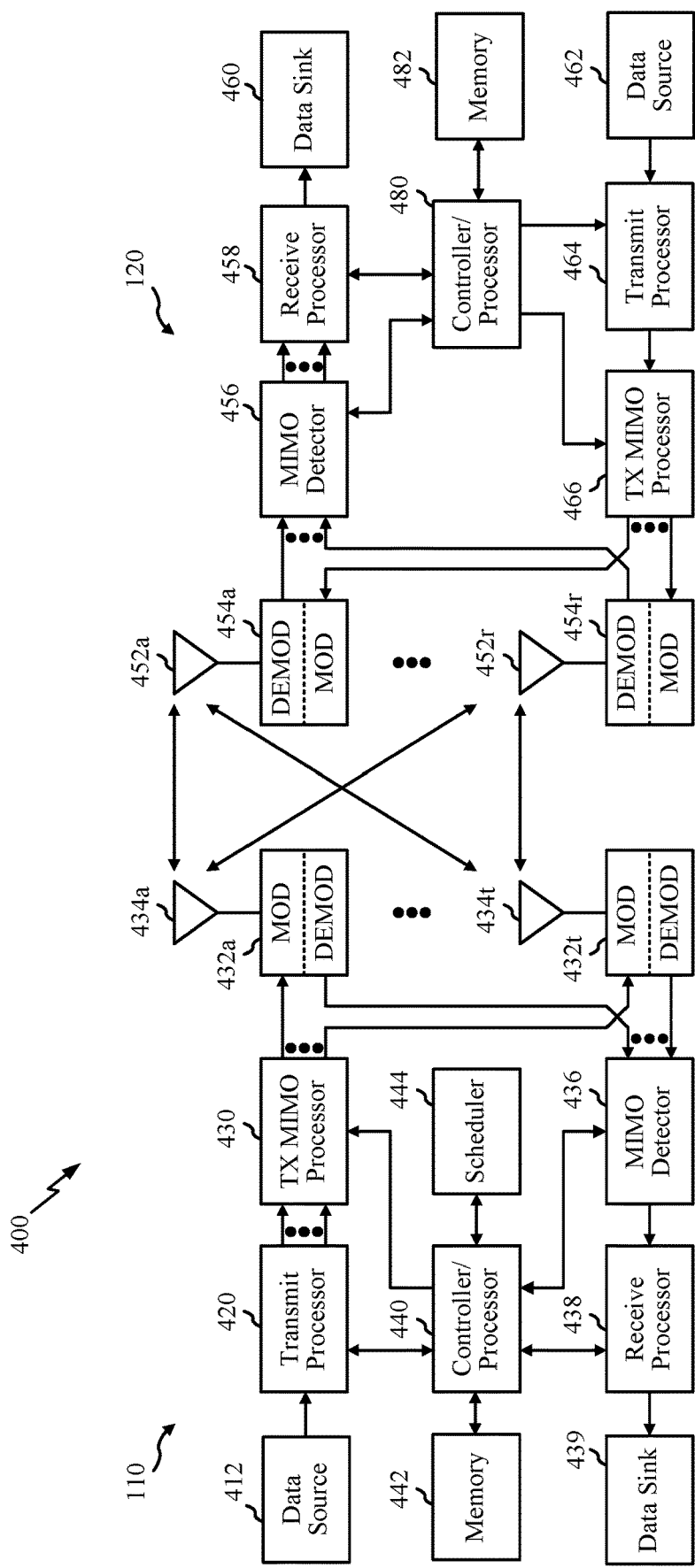
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) transmission from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 480 and/or other processors and modules at the UE 120 may perform or direct the execution of processes for the techniques described herein, for example, with reference to FIG. 9. The processor 440 and/or other processors and modules at the BS 110 may perform or direct the execution of processes for the techniques described herein, for example, with reference to FIG. 10. The memories 442 and 482 may store data and program codes for BS 110 and UE 120, respectively. A scheduler 444 may schedule UEs for data transmission on the downlink and/or uplink.

Figure 5:
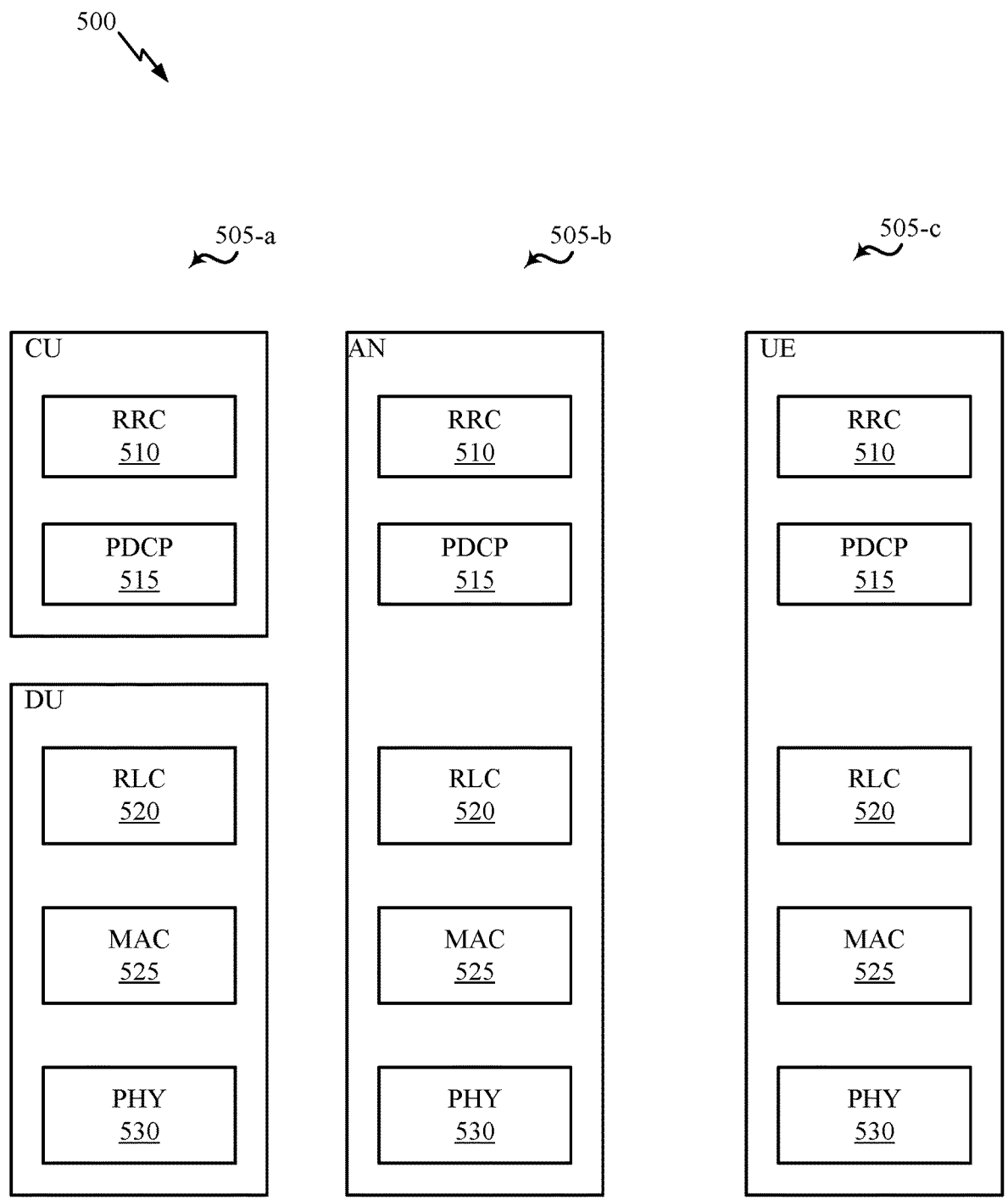
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., a DU such as TRP DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
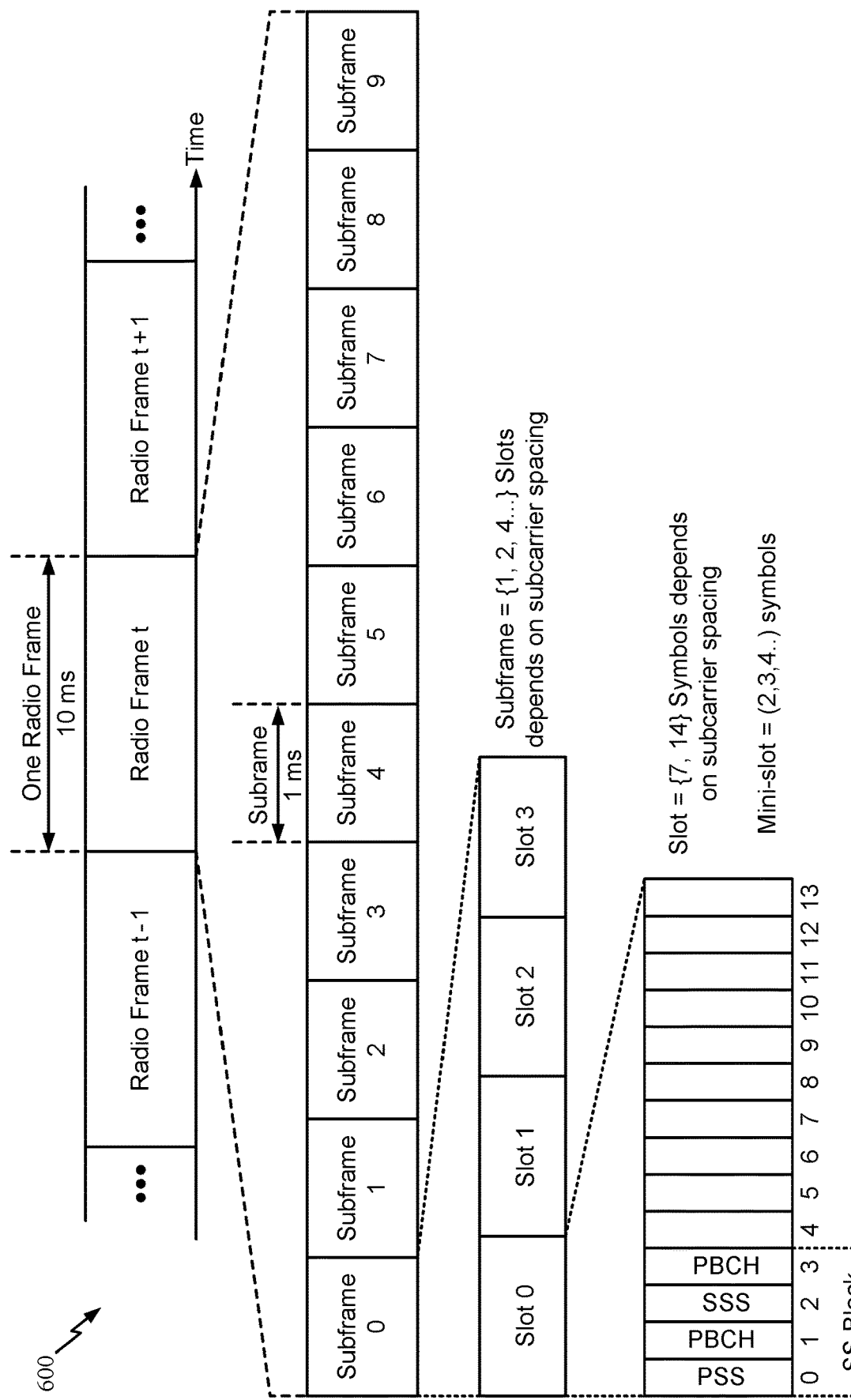
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example SRS Transmissions

In wireless communication systems, such as the wireless communication system described above, user equipments (UEs) may transmit sounding reference signals (SRSs) so that the network/base station (e.g., eNBs, gNB, etc.) can measure uplink channel quality. Conventionally, one SRS is transmitted by a UE in a last symbol of a normal uplink (UL) subframe. However, more recently, additional symbols have been introduced for transmitting SRSs in a normal UL subframe.

These additional SRS symbols may be identified based on a flexible SRS symbol location configuration and/or a virtual cell ID associated with the UE that transmitted the (additional) SRSs. In this context, a "normal subframe" is contrasted with a "special subframe" such as those defined and placed between "normal DL subframes" and "normal UL subframes" that are designed to allow a UE sufficient time to switch between receive and transmit processing.

Increasing SRS capacity by introducing more than one symbol for SRS on an UL normal subframe may be part of an overall support of and advance of coverage enhancements. Increasing SRS capacity may involve introducing more than one symbol for SRS for one UE or for multiple UEs on a UL normal subframe. As a baseline, a minimum SRS resource allocation granularity for a cell may be one slot (e.g., one of two time slots of a subframe) or a subframe, when more than one symbol in a normal subframe is allocated for SRS for the cell. As noted above, a virtual cell ID may be introduced for SRS, allowing different SRS transmissions to be distinguished.

Additionally, in some cases, intra-subframe frequency hopping and repetition may be supported for aperiodic SRS in the additional SRS symbols of a normal uplink subframe. Intra-subframe frequency hopping for aperiodic SRS transmission may involve transmitting aperiodic SRSs on different frequency bands on a symbol-by-symbol basis in a subframe. Additionally, aperiodic SRS repetition may involve repeating transmission of an aperiodic SRS, transmitted in a first additional symbol of a subframe (e.g., using a first antenna, frequency band, etc.), in a second additional symbol of the subframe.

Further, intra-subframe antenna switching may be supported for aperiodic SRS in the additional SRS symbols. Intra-subframe antenna switching for aperiodic SRS transmission may involve transmitting aperiodic SRSs using different antennas on a symbol-by-symbol basis in a subframe.

Both legacy SRS and additional SRS symbol(s) may be configured for the same UE. In some cases, the legacy SRS may be a periodic SRS (P-SRS) or an aperiodic SRS (A-SRS). Additionally, in some cases, the additional SRS may be aperiodically triggered. Currently, a UE may be allowed to transmit periodic legacy SRS and aperiodic additional SRS in the same normal uplink subframe. In the case of aperiodic legacy SRS, a UE may transmit only one of legacy SRS or additional SRS symbol(s) in a normal uplink subframe.

The time location of possible additional SRS symbols in one normal UL subframe for a cell may be selected from various options. According to a first option, all symbols in only one slot of one subframe may be used for SRS from the cell perspective. According to a second option, all symbols in one subframe may be used for SRS from the cell perspective. In some cases, cell-specific configurations of SRS resources in slot-level granularity may be implemented.

Example Collision Handling for SRS and PUSCH in CA

In carrier aggregation (CA) scenarios, due to the flexibility of the time location(s) of possible SRS symbols, the possibility exists that SRS transmissions in one component carrier (CC1) may overlap (collide) in the time domain with PUSCH transmissions in another CC (CC2). There are different options for handling such collisions in conventional systems.

For example, as illustrated in FIG. 7A, in an LTE deployment using a single RF chain (intra-band CA), an SRS transmission scheduled in CC1 colliding with a PUSCH transmission scheduled in CC2 may be dropped. As further illustrated in FIG. 7A, in an LTE deployment using multiple RF chains (inter-band CA), the SRS transmission scheduled in CC1 may be allowed if power conditions are met (e.g., a maximum power parameters, Pcmax, is not exceeded), otherwise SRS may be dropped.

As illustrated in FIG. 7B, in an intra-band CA NR deployment, an eNB should avoid scheduling SRS transmissions in CC1 that collide with PUSCH transmissions in CC2 (a UE may consider it an error condition if an eNB does schedule this). As further illustrated in FIG. 7B, in an inter-band NR deployment, the SRS transmissions scheduled in CC1 may be allowed if power conditions are met (e.g., Pcmax is not exceeded) and may even be allowed if Pcmax is exceeded by applying power scaling.

Aspects of the present disclosure provide techniques that may help newer UEs (e.g., LTE Rel-16 UEs), with more than one SRS symbol in a normal uplink subframe, handle collisions of SRS and PUSCH transmissions in inter-band and intra-band CCs. For inter-band CA, it may be possible to send SRS, in some cases (with or without power scaling).

For intra-band CA, aspects of the present disclosure provide alternatives to simply always dropping new multiple SRSs, which would result in a waste of system resources. As will be described in greater detail below, the techniques presented herein may consider (and help avoid/mitigate) the phase discontinuity of a PUSCH transmission due to power change within the subframe.

Figure 8A:
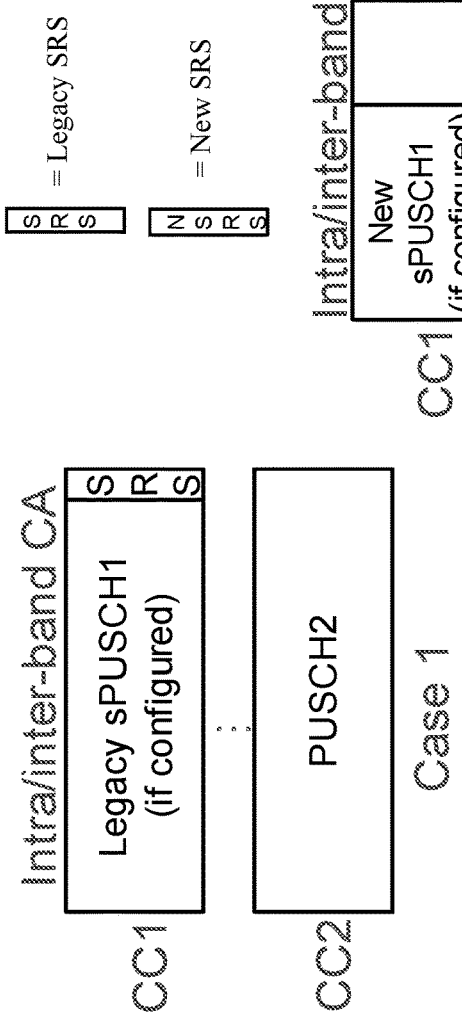
FIGS. 8A, 8B, and 8C illustrate examples of subframes with SRS and PUSCH transmissions on overlapping (colliding) resources

The techniques presented herein may be applied in a variety of different cases involving PUSCH transmission with legacy and/or new SRS resources in inter-band and intra-band CCs. For example, the techniques may be applied in a first case shown in FIG. 8A, with PUSCH transmission in one CC (CC2) and legacy SRS only (as shown in the last symbol) in another CC (CC1).

Figure 8B:
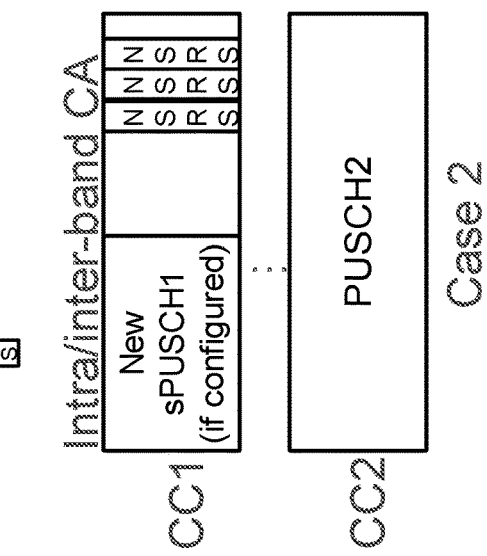

The techniques may also be applied in a second case shown in FIG. 8B, with PUSCH transmission in CC2 and new SRS only in CC1, where new SRS symbols in the same subframe/same CC may have a power change due to SRS antenna switching (AS) and/or frequency hopping (FH). Different power control for new SRS/sPUSCH/empty symbols may cause power change as well.

Figure 8C:
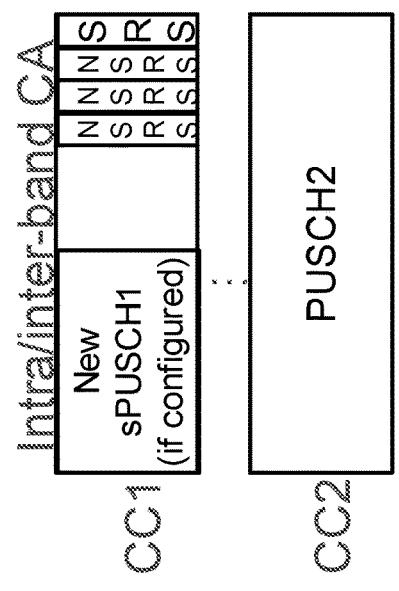

The techniques may also be applied in a third case shown in FIG. 8C, with PUSCH transmission in CC2 and a possible combination of new SRSs and legacy SRS in CC1. As with the second case described above, new SRS and legacy SRS in the same subframe/same CC may have different power control.

Figure 9:
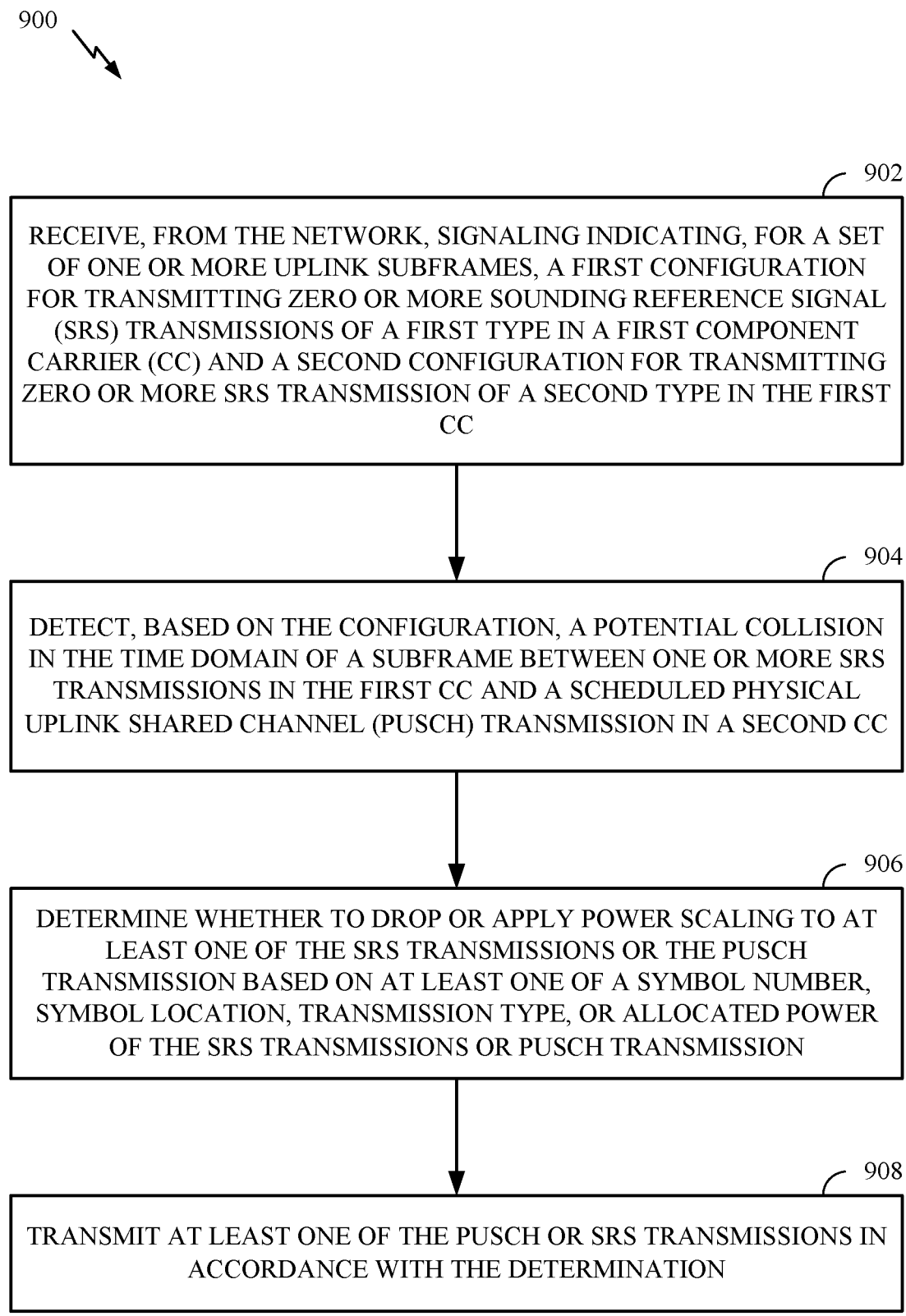
FIG. 9 illustrates example operations for wireless communications by a user equipment, in accordance with certain aspects of the present disclosure.

FIG. 9 illustrates example operations 900 for wireless communications by a network entity. For example, operations 900 may be performed by a UE to be configured and transmit SRS in accordance with aspects of the present disclosure. Operations 900 may be performed, for example, by UE 120 shown in FIG. 1 or FIG. 4.

Operations 900 begin, at 902, by receiving, from the network, signaling indicating, for a set of one or more uplink subframes, a first configuration for transmitting zero or more sounding reference signal (SRS) transmissions of a first type in a first component carrier (CC) and a second configuration for transmitting zero or more SRS transmission of a second type in the first CC.

At 904, the UE detects, based on the configuration, a potential collision in the time domain of a subframe between one or more SRS transmissions in the first CC and a scheduled physical uplink shared channel (PUSCH) transmission in a second CC.

As used herein, the term "transmission type" generally refers to different dropping rules for legacy SRS and new SRS based on separate RRC configurations and may also refer to different dropping rules for periodic (e.g., trigger type0) or aperiodic (e.g., trigger type1) SRS transmissions. Transmission type may also refer to different dropping rules for PUSCH transmission with or without uplink control information (UCI) or different types of UCI, such as HARQ ACK, scheduling request, or CQI feedback, etc.

At 906, the UE determines whether to drop or apply power scaling to at least one of the SRS transmissions or the PUSCH transmission based on at least one of a transmission type, symbol number, symbol location, or allocated power of the SRS transmissions or PUSCH transmission. At 908, the UE transmits at least one of the PUSCH or SRS transmissions in accordance with the determination.

Figure 10:
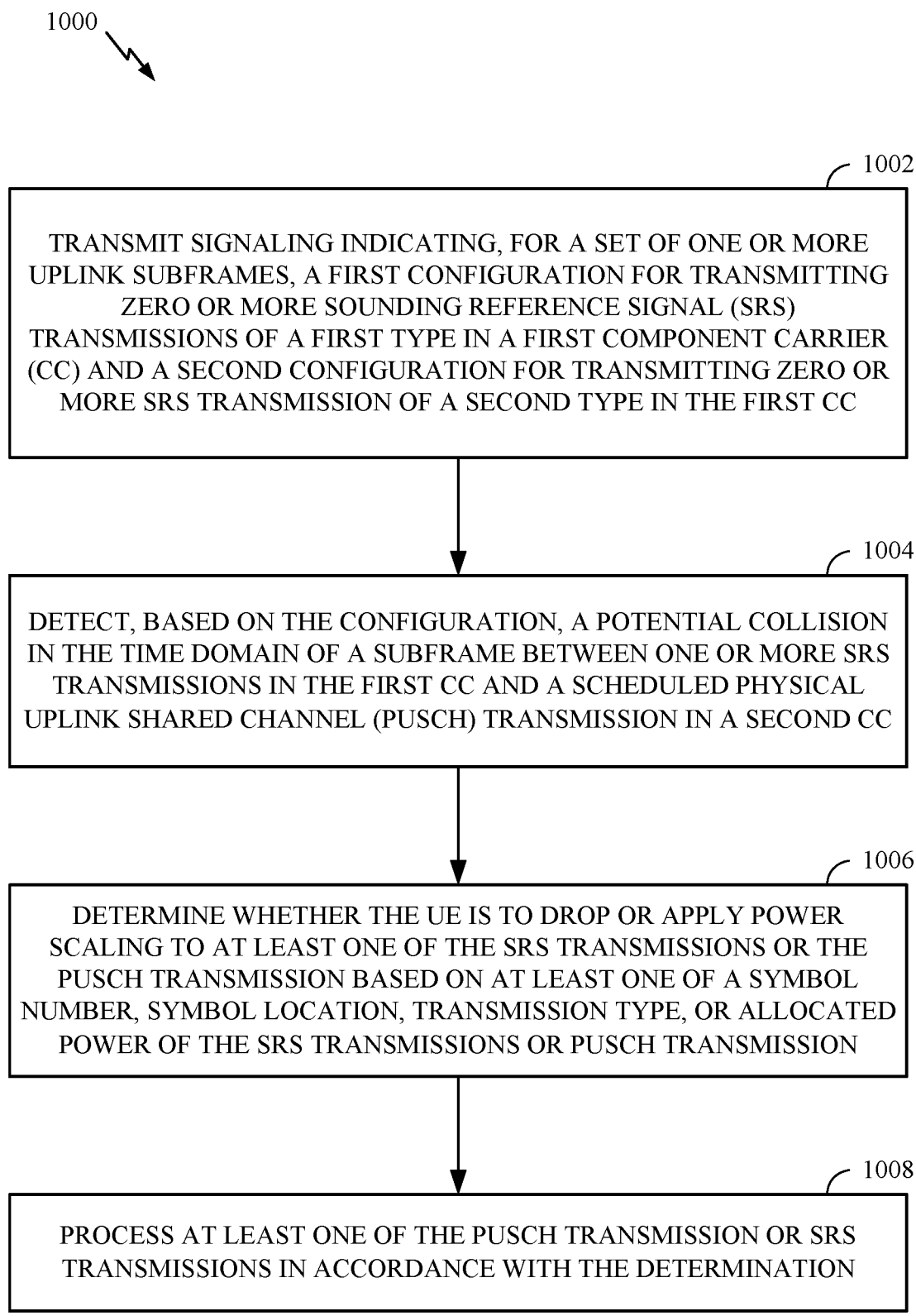
FIG. 10 illustrates example operations for wireless communications by a network entity, in accordance with certain aspects of the present disclosure.

FIG. 10 illustrates example operations 1000 for wireless communications by a network entity. Operations 1000 may be configured complementary to operations 900 of FIG. 9. For example, operations 1000 may be performed by a base station (e.g., gNB) 110 of FIG. 1 or FIG. 4 to configure a UE performing operations 900 for SRS transmission in accordance with aspects of the present disclosure.

Operations 1000 begin, at 1002, by transmitting signaling indicating, for a set of one or more uplink subframes, a first configuration for transmitting zero or more sounding reference signal (SRS) transmissions of a first type in a first component carrier (CC) and a second configuration for transmitting zero or more SRS transmission of a second type in the first CC.

At 1004, the network entity detects, based on the configuration, a potential collision in the time domain of a subframe between one or more SRS transmissions in the first CC and a scheduled physical uplink shared channel (PUSCH) transmission in a second CC.

At 1006, the network entity determines whether the UE is to drop or apply power scaling to at least one of the SRS transmissions or the PUSCH transmission based on at least one of a transmission type, symbol number, symbol location, or allocated power of the SRS transmissions. At 1008, the network entity processes at least one of the PUSCH or SRS transmissions in accordance with the determination.

For inter-band CA, a decision of whether to drop (or send) SRS with (or without) power scaling may be made by considering the type, number, location, and or allocated power of SRSs symbols. For example, if a legacy SRS is scheduled on a first CC with no PUSCH (or sPUSCH) transmission, as shown in FIG. 11A, and PUSCH transmission is scheduled on a second CC, the UE may transmit both if it is capable of inter-band CA.

Figure 11B:
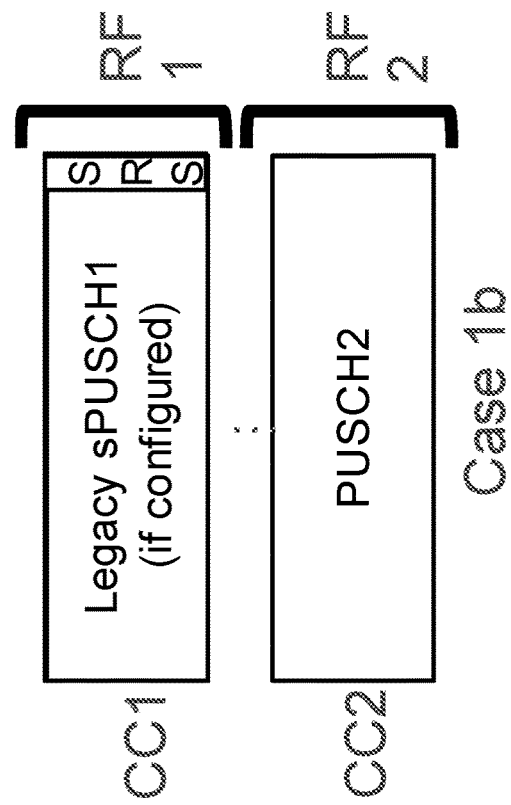
FIGS. 11A and 11B illustrate examples of subframes with SRS and PUSCH transmissions on overlapping (colliding) resources that may be processed in accordance with certain aspects of the present disclosure.
Figure 11A:
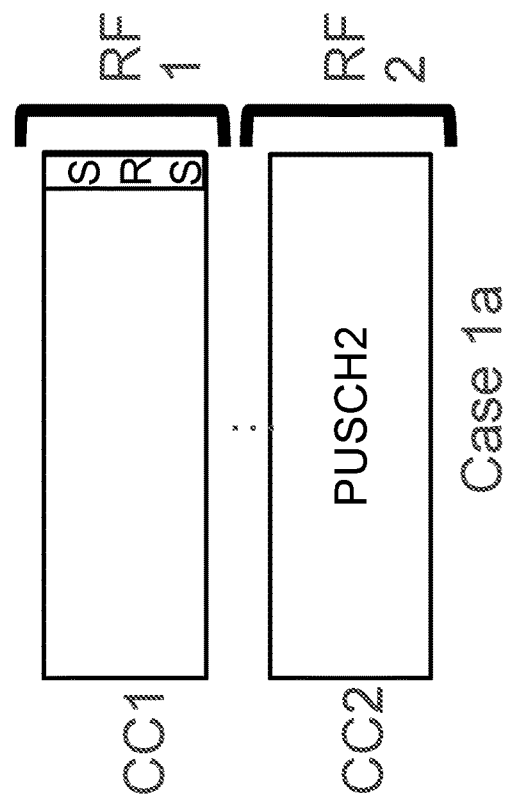

If a shortened PUSCH (sPUSCH) transmission is scheduled for transmission in the same CC as an SRS transmission, as shown in FIG. 11B, the type, power, and length of the sPUSCH transmission may also be considered.

If the UE is incapable of supporting SRS and PUSCH transmissions for inter-band CA (and reports the same), the UE may drop SRS and/or PUSCH transmission when a collision is detected.

If the UE can support SRS and s for inter-band CA, whether to drop and/or apply power scaling may depend on power considerations. For example, if power in a symbol is no larger than a threshold value (Pcmax), the UE may send both SRS and PUSCH transmissions.

If the power exceeds Pcmax, however, power scaling or SRS dropping may be applied, depending on a particular case. For example, for the first case described above, with legacy SRS in last symbol (as shown in FIG. 11A) and possibly legacy sPUSCH1 transmission configured in the same CC (as shown in FIG. 11B), there are various alternatives.

According to a first alternative, a UE may drop legacy SRS and transmit the legacy sPUSCH1 (if configured) in CC1. According to a second alternative, the UE may drop the PUSCH2 transmission and transmit the legacy SRS, different from the legacy UE behavior described above, in the subframes configured for potential transmission of additional new SRSs. In some cases, a UE may apply these rules across cells in timing advanced groups (TAGs). For example, if a UE is configured with multiple TAGs, the UE may apply the rules described herein for collisions of SRS and PUCCH/PUSCH transmissions for different serving cells in the same or different TAGs.

According to a third alternative, the UE may apply power scaling based on a priority order (e.g., PUSCH2>SRS or SRS>PUSCH2). In some cases, such power scaling may only be applied if the power difference is within a limit. For example, according to a fourth alternative, if a power difference between SRS and PUSCH2 is no larger than a threshold of [X]dB, power scaling may be applied according to the third alternative (otherwise, SRS or PUSCH transmissions may be dropped according to the first or second alternatives). The value of X may be predefined, dependent on the UE capability, or indicated by RRC signaling, and may be the same across serving cells (e.g., of a primary or secondary cell group).

Figure 12B:
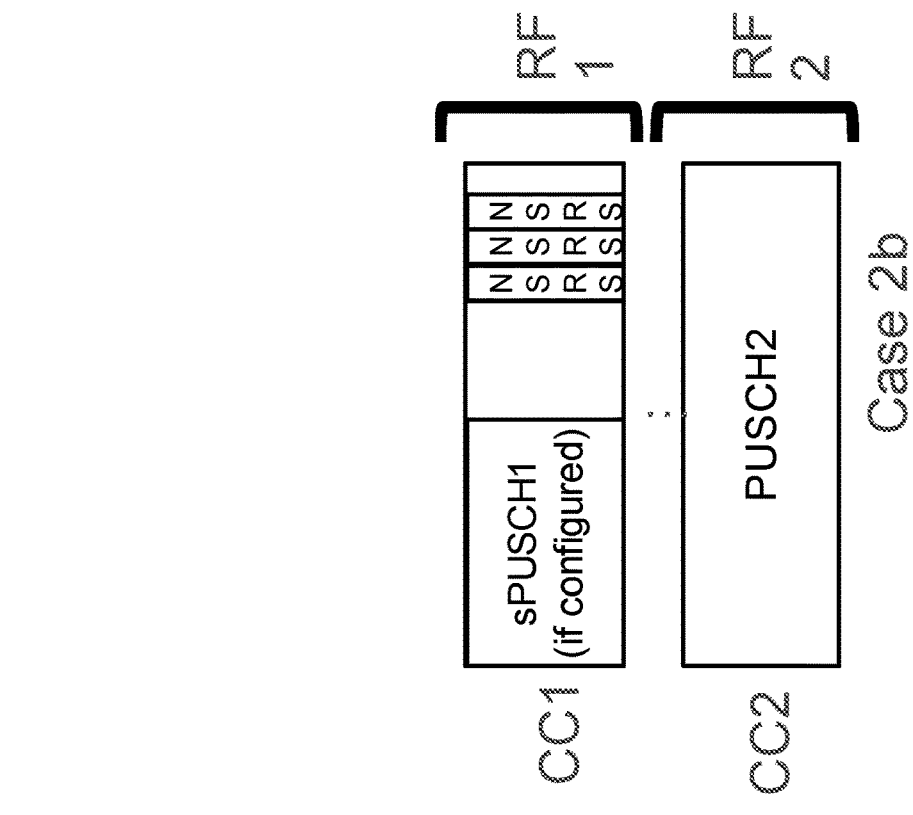
FIGS. 12A and 12B illustrate examples of subframes with SRS and PUSCH transmissions on overlapping (colliding) resources that may be processed in accordance with certain aspects of the present disclosure.
Figure 12A:
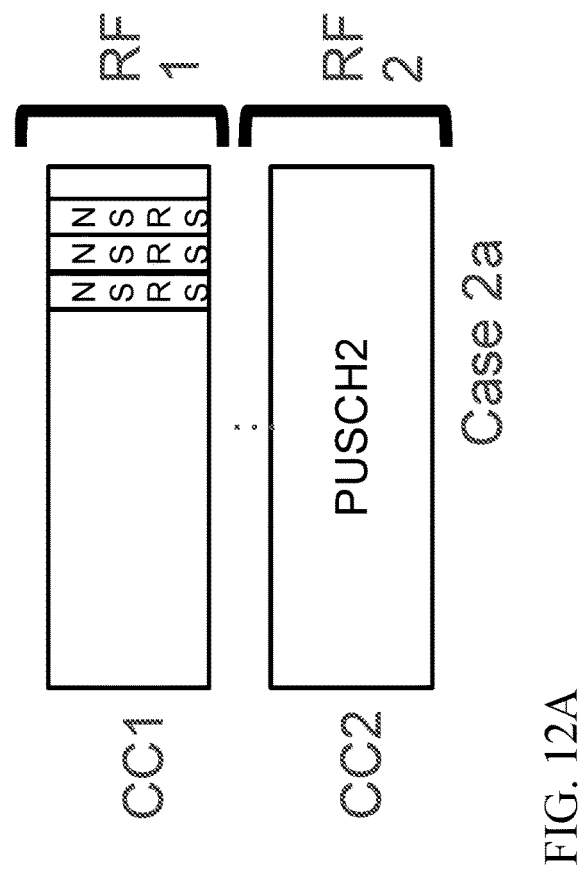

If the UE can support SRS and PUSCH transmissions for inter-band CA, there are also various alternatives for the second case described above, with new SRS (as shown in FIG. 12A) and possibly legacy sPUSCH1 transmission configured in the same CC (as shown in FIG. 12B). As noted above, a UE may apply the following rules across cells in timing advanced groups (TAGs).

For example, according to a first alternative, the UE may drop new SRS. The UE also may or may not send sPUSCH1 (if configured) based on a power efficiency condition (e.g., drop sPUSCH1 transmission if less than one slot duration). According to a second alternative, the UE may drop the PUSCH2 transmission or part of the PUSCH2 transmission, and keep new SRS and sPUSCH1 (if configured) transmissions. For example, the UE may drop one slot of PUSCH2 transmission fully or partially overlapped with new SRS and send the other slot of PUSCH2 transmission with rate matching or without rate matching (puncturing).

According to a third alternative, the UE may apply power scaling based on a priority order (e.g., PUSCH2>SRS or SRS>PUSCH2). As in the case described above, such power scaling may only be applied if the power difference is within a limit. For example, according to a fourth alternative, if a power difference between SRS and PUSCH2 transmissions is no larger than a threshold of [X]dB, power scaling may be applied according to the third alternative (otherwise, SRS or PUSCH transmissions may be dropped according to the first or second alternatives). The value of X may be predefined, dependent on the UE capability, or indicated by RRC signaling, and may be the same across serving cells (e.g., of a primary or secondary cell group).

Figure 13B:
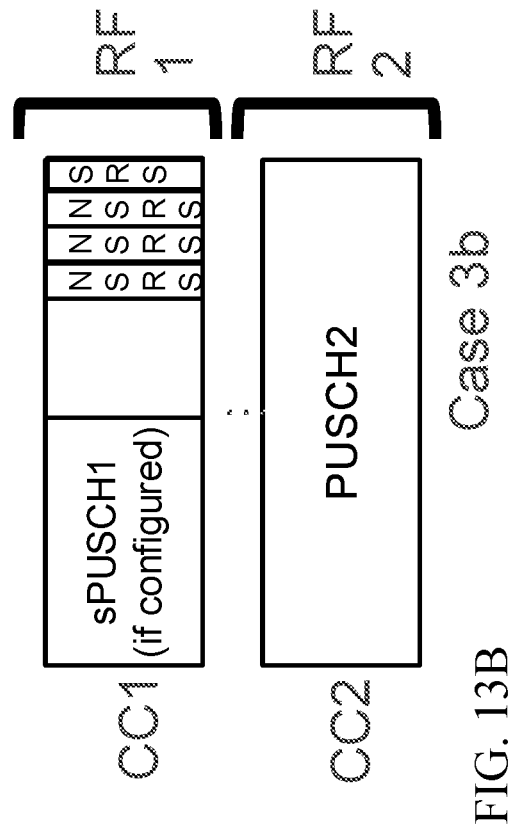
FIGS. 13A and 13B illustrate examples of subframes with SRS and PUSCH transmissions on overlapping (colliding) resources that may be processed in accordance with certain aspects of the present disclosure.
Figure 13A:
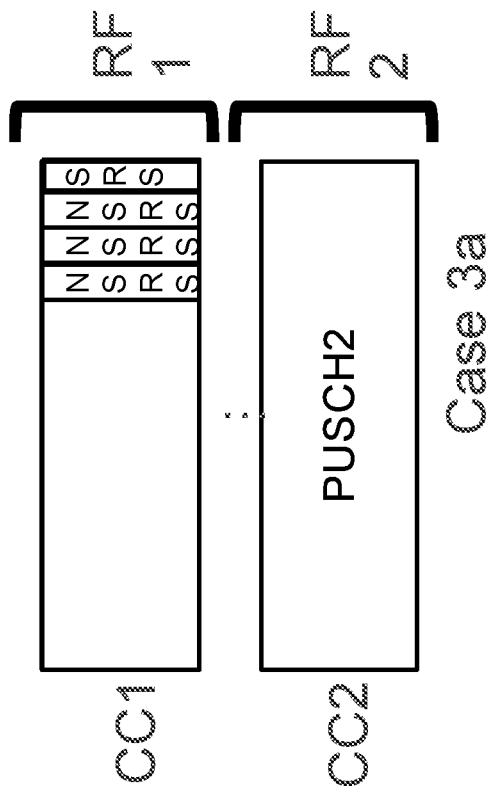

If the UE can support SRS and PUSCH transmissions for inter-band CA, there are also various alternatives for the third case described above, with new and legacy SRS (as shown in FIG. 13A) and sPUSCH1 transmissions if configured in the same CC, as shown in FIG. 13B).

According to a first alternative, the UE may drop legacy SRS and/or new SRS if an SRS symbol power exceeds Pcmax or drop legacy SRS and new SRS together if any one of the SRS symbols exceeds Pcmax. Since the symbol or a group of symbols for new SRS transmission share the same SRS power control, which may be different from that of legacy SRS, the symbol-wise or symbol-group-wise drop/power scaling of new SRS symbols and legacy SRS symbols may be independently treated. If there is PUCCH/PUSCH transmission in another CC, the subframe-wise dropping/power scaling of new SRS and legacy SRS UE may be preferred to keep the power/phase continuity of the PUCCH/PUSCH transmission. The UE may or may not send sPUSCH1 (if configured) in such cases, for example, based on power efficiency requirement (e.g., drop sPUSCH1 transmission if less than one slot duration). For example, the power amplifier efficiency would be lower than the possible requirement if assuming the total power of two CCs for the whole subframe, but only power of one CC is used during more than half of the subframe time.

According to a second alternative, the UE may drop PUSCH2 (or part of PUSCH2) transmission, and keep new SRS, legacy SRS and sPUSCH1 (if configured) transmissions. For example, the UE may drop one slot of PUSCH2 transmission that overlaps with new/legacy SRS transmission and send the other slot of PUSCH2 with rate matching or without rate matching (puncturing).

According to a third alternative, the UE may apply power scaling based on a priority order (e.g., PUSCH2>SRS or SRS>PUSCH2). As in the case described above, such power scaling may only be applied if the power difference is within a limit. For example, according to a fourth alternative, if a power difference between SRS and PUSCH2 transmissions is no larger than a threshold of [X]dB, power scaling may be applied according to the third alternative. Otherwise, if the power difference is greater than the threshold, SRS or PUSCH transmissions may be dropped according to the first or second alternatives. The value of X may be predefined, dependent on the UE capability, or indicated by RRC signaling, and may be the same across serving cells (e.g., of a primary or secondary cell group).

For intra-CA, if the UE is incapable of supporting SRS and PUSCH transmissions, the UE may drop either SRS, PUSCH, or both.

Figures 14A, 14B, 14C:
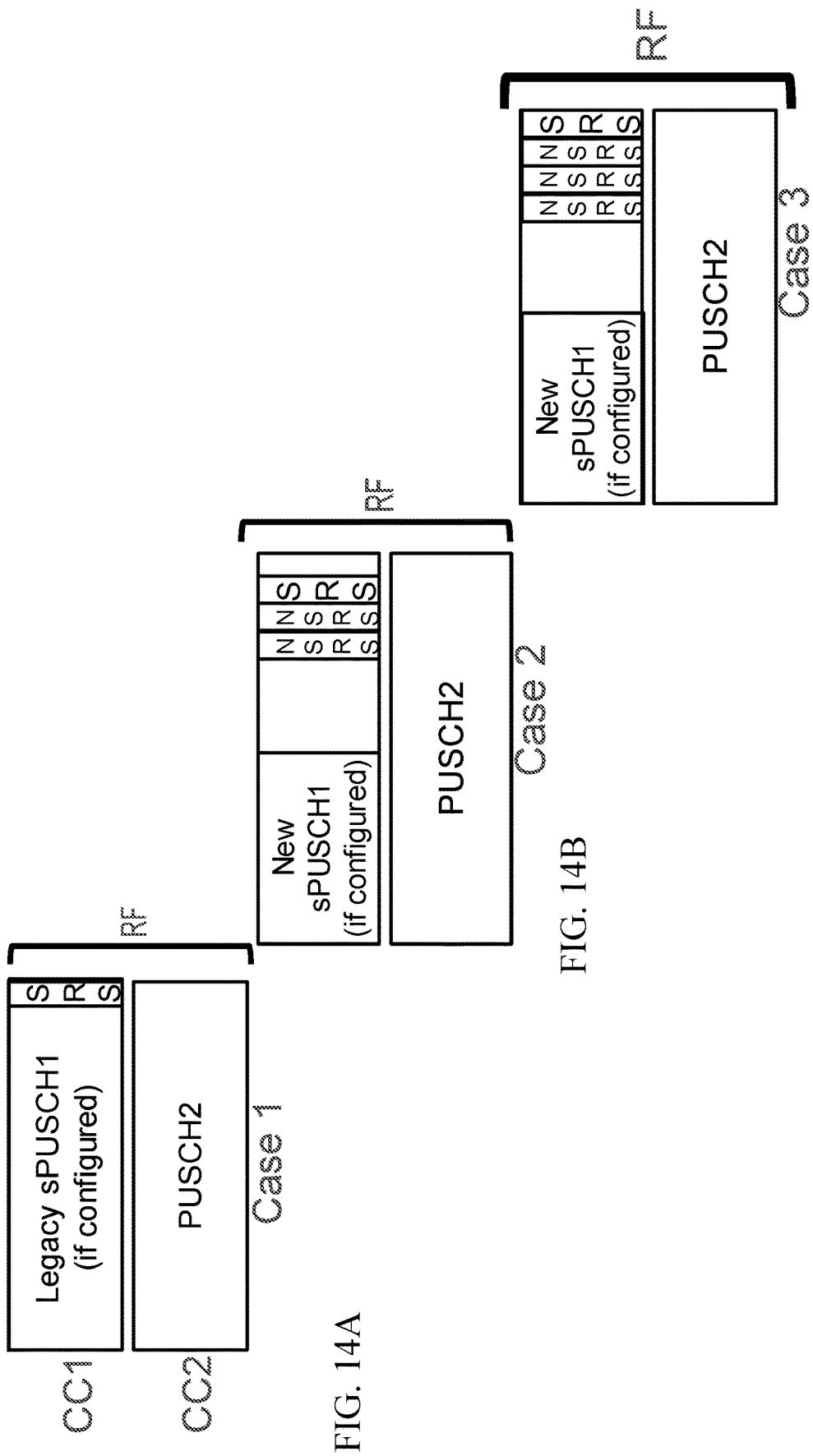
FIGS. 14A, 14B, and 14C illustrate examples of subframes with SRS and PUSCH transmissions on overlapping (colliding) resources that may be processed in accordance with certain aspects of the present disclosure.

As with inter-CA, there are also various alternatives if the UE can support SRS and PUSCH transmissions for intra-band CA for the various cases shown in FIGS. 14A, 14B, and 14C. With intra-band CA, the dropping/power scaling rules may be defined based on the UE capability for SRS and PUSCH transmission collision in intra-band CCs, for example, with the rules considering the type, number, location, and power of SRS symbols and the type/power/length of sPUSCH (if configured in the same CC) as well as a power change limitation.

In some cases, the UE may support SRS and PUSCH transmissions for intra-band CA with power change limitation. The power change limitation may refer to condition/requirement that a power difference of new SRS/legacy SRS/sPUSCH1 symbols is no larger than [Y]dB, and/or the power change times of new SRS/legacy SRS/sPUSCH1/empty symbols is no larger than a threshold [Z].

If the power change limitation noted above is not satisfied, the UE may not be able to maintain phase continuity of PUSCH2 transmissions. Y and Z may be predefined, dependent on the UE capability, or indicated by RRC signaling, and may be the same across serving cells (e.g., of a primary or secondary cell group).

If the UE can support SRS and PUSCH transmissions for intra-band CA, if the power is no larger than Pcmax, and the power change limitation is satisfied, the UE may send SRS and PUSCH (with no dropping or power scaling).

If, on the other hand, the power is no larger than Pcmax, but the power change limitation is NOT satisfied, the UE may drop SRS or PUSCH transmissions and/or apply power scaling according to one or more alternatives.

For example, according to a first alternative, the UE may drop SRS/sPUSCH1 transmissions or scale power of SRS/sPUSCH1 to satisfy the power change limitation based on a priority order. Example priority orders include (in order of higher priority to lower priority):
  1. New SRS (if number>=N)→sPUSCH1→new SRS (if number<N)→legacy SRS.
  2. sPUSCH1 with special UCI (e.g., ACK/SI)→new SRS (if number>=→other sPUSCH1→new SRS (if number<N)>legacy SRS.
where N may be predefined or RRC configured.

According to a second alternative, the UE may drop PUSCH2 (or part of PUSCH2) transmissions to satisfy the phase continuity. For example, the UE may drop one slot of PUSCH2 transmission overlapped with new SRS transmission and send the other slot of PUSCH2 transmission with or without rate matching.

According to a third alternative, the UE may power scale SRS/sPUSCH1 transmissions to satisfy the power change limitation based on a prioritization order. Example prioritization order include (in order of higher priority to lower priority):
  1. New SRS (if number>=N)→sPUSCH1→new SRS (if number<N)→legacy SRS.
  2. sPUSCH1 with special UCI (e.g., ACK/SI)→new SRS (if number>=N)→other sPUSCH1→new SRS (if number<N)>legacy SRS.

According to a fourth alternative, the UE may apply power scaling (per the third alternative) only if a power difference between new SRS/legacy SRS/sPUSCH1 transmissions is no larger than [X]dB (otherwise, it may drop SRS and/or PUSCH2 per the first or second alternatives).

Figure 15B:
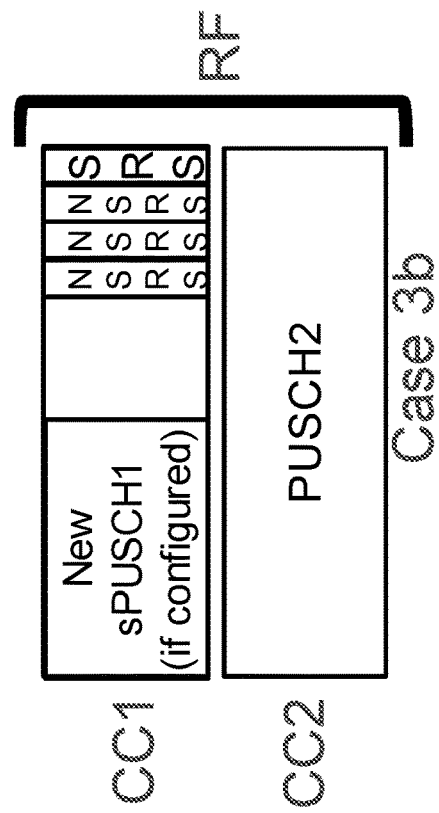
FIGS. 15A and 15B illustrate examples of subframes with SRS and PUSCH transmissions on overlapping (colliding) resources that may be processed in accordance with certain aspects of the present disclosure.
Figure 15A:
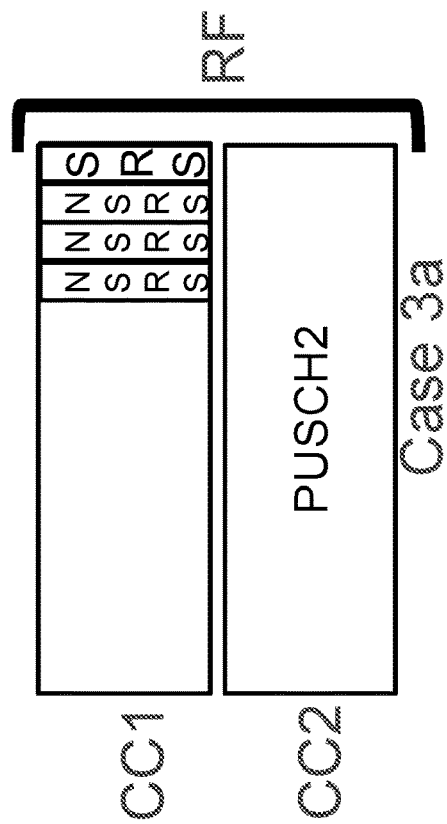

In some cases, a UE may support SRS and PUSCH transmissions for intra-band CA if the power exceeds Pcmax, but the power change limitation is satisfied. This may be similar to dropping/power scaling for SRS and PUSCH transmissions in inter-band CA described above, when exceeding Pcmax (e.g., for the case with new SRS and legacy SRS as shown in FIG. 15A and with new SRS and legacy SRS and sPUSCH1 transmissions if configured in the same CC as shown in FIG. 15B).

According to a first alternative, the UE may drop one of a legacy SRS transmission or new SRS transmission if an SRS symbol is exceeding Pcmax or drop both legacy SRS and new SRS transmissions together if any one of SRS symbol is exceeding Pcmax and may or may not send sPUSCH1 (if configured) based on power efficiency requirement (e.g., the UE may drop sPUSCH1 transmission if less than one slot duration).

According to a second alternative, the UE may drop a PUSCH2 (or part of PUSCH2) transmission, and keep new SRS, legacy SRS and sPUSCH1 transmissions (if configured). For example, the UE may drop one slot of PUSCH2 transmission fully or partially overlapped with new/legacy SRS transmissions and send the other slot of PUSCH2 with or without rate matching.

According to a third alternative, the UE may apply power scaling based on a priority order (e.g., PUSCH2→SRS or SRS→PUSCH2). According to a fourth alternative, the UE may apply such power scaling only if a power difference between SRS and PUSCH2 transmissions is no larger than [X]dB, Alt3; otherwise Alt1 or Alt2. As in the cases described above, X can be predefined, dependent on the UE capability, or indicated by RRC signaling, and may be the same across serving cells (e.g., of a primary or secondary cell group).

In some cases, if power exceeds Pcmax and the power change limitation is NOT satisfied, the UE may apply a two-step approach. In a first step, the UE may apply dropping/power scaling to satisfy power change limitation, as described above. In a second step, the UE may apply additional dropping/power scaling to make power no larger than Pcmax, described above. The first and second steps may also be reversed.

In some cases, power scaling of SRS and/or PUSCH2 transmissions in another CC may be applied even if the UE is not power limited to reduce the power differences between SRS and PUSCH2 transmissions. For example, for intra-band CA, the power scaling is designed to make the range of power difference between SRS and PUSCH transmissions in different CCs no larger than a threshold so as to satisfy additional requirements, such as EVM and ACLR (adjacent channel leakage emission) requirements. The threshold can be predefined, dependent on the UE capability, or indicated by RRC signaling, and may be the same across serving cells (e.g., of a primary or secondary cell group).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, various operations shown in FIGS. 9 and 10 may be performed by various processors shown in FIG. 4. More particularly, operations 1000 of FIG. 10 may be performed by processors 420, 460, 438, and/or controller/processor 440 of the BS 110 shown in FIG. 4 while operations 900 of FIG. 9 may be performed by one or more of processors 466, 458, 464, and/or controller/processor 480 of the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9 and FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a user equipment (UE) in a network, comprising:
    receiving, from the network, signaling indicating, for a set of one or more uplink subframes, a first configuration for transmitting zero or more sounding reference signal (SRS) transmissions of a first type in a first component carrier (CC) and a second configuration for transmitting zero or more SRS transmissions of a second type in the first CC;
    detecting, based on the configuration, a potential collision in a time domain of a subframe between one or more SRS transmissions in the first CC and a scheduled physical uplink shared channel (PUSCH) transmission in a second CC;
    determining whether to drop or apply power scaling to at least one of the SRS transmissions or the PUSCH transmission based on at least one of a transmission type, symbol number, symbol location, or allocated power of the SRS transmissions or PUSCH transmission, wherein:
        a shortened PUSCH is also scheduled for transmission on the first CC in the subframe; and
        the determination is to drop at least one SRS transmission if total allocated power for a symbol or group of symbols including the SRS transmissions is greater than a transmit power threshold and also to transmit the shortened PUSCH or drop the shortened PUSCH transmission depending on a length of the shortened PUSCH transmission; and
    transmitting at least one of the PUSCH or SRS in accordance with the determination.

2. The method of claim 1, wherein:
    the SRS transmission is scheduled for transmission in the first CC using a first radio frequency (RF) chain; and
    the PUSCH transmission is scheduled for transmission in the second CC using a second RF chain.

3. The method of claim 1, wherein the determination is to drop at least one of the SRS transmissions or the PUSCH transmission if the UE is not capable of transmitting both SRS and PUSCH in a same subframe.

4. The method of claim 1, further comprising signaling a capability of the UE to support or not support transmitting both SRS and PUSCH in a same subframe.

5. The method of claim 1, wherein:
    the determination is to not drop or power scale SRS transmissions if total allocated transmit power for a symbol or a group of symbols including the SRS transmissions is less than a transmit power threshold.

6. The method of claim 1, wherein the determination is to drop the shortened PUSCH transmission if its length is less than a slot duration.

7. The method of claim 1, wherein:
    the determination is to drop at least part of the PUSCH transmission if total allocated transmit power for a symbol or a group of symbols including the SRS transmissions is greater than a transmit power threshold.

8. The method of claim 7, wherein the determination is:
    to drop a part of the PUSCH transmission in a slot of the subframe that fully or partially overlaps with the SRS transmissions; and
    to transmit another part of the PUSCH transmission in a slot of the subframe that does not fully or partially overlap with the SRS transmissions.

9. A method of wireless communications by a user equipment (UE) in a network, comprising:
- receiving, from the network, signaling indicating, for a set of one or more uplink subframes, a first configuration for transmitting zero or more sounding reference signal (SRS) transmissions of a first type in a first component carrier (CC) and a second configuration for transmitting zero or more SRS transmissions of a second type in the first CC;
- detecting, based on the configuration, a potential collision in a time domain of a subframe between one or more SRS transmissions in the first CC and a scheduled physical uplink shared channel (PUSCH) transmission in a second CC;
- determining whether to drop or apply power scaling to at least one of the SRS transmissions or the PUSCH transmission based on at least one of a transmission type, symbol number, symbol location, or allocated power of the SRS transmissions or PUSCH transmission, wherein:
  - the determination is to apply power scaling to at least one of the SRS transmissions or the PUSCH transmission if allocated transmit power for a symbol or a group of symbols including the SRS transmissions is greater than a transmit power threshold, and
  - the power scaling is applied with a priority based on a power difference between symbols of the PUSCH transmission and SRS transmissions, if the power difference between symbols of the PUSCH transmission and SRS transmissions is no larger than a threshold power difference; and
- transmitting at least one of the PUSCH or SRS in accordance with the determination.

10. The method of claim 9, wherein the threshold power difference is determined based on at least one of: a capability of the UE, a predefined value, or radio resource control (RRC) signaling.

11. The method of claim 1, wherein:
the SRS transmissions include SRS of both the first type and the second type.

12. The method of claim 11, wherein the determination is to drop at least one of an SRS transmission of the first type or the second type of SRS comprise at least SRS of a first type and at least one SRS of a second type if allocated transmit power for a symbol or a group of symbols including the SRS transmissions is greater than a transmit power threshold.

13. A method of wireless communications by a user equipment (UE) in a network, comprising:
- receiving, from the network, signaling indicating, for a set of one or more uplink subframes, a first configuration for transmitting zero or more sounding reference signal (SRS) transmissions of a first type in a first component carrier (CC) and a second configuration for transmitting zero or more SRS transmissions of a second type in the first CC;
- detecting, based on the configuration, a potential collision in a time domain of a subframe between one or more SRS transmissions in the first CC and a scheduled physical uplink shared channel (PUSCH) transmission in a second CC;
- determining whether to drop or apply power scaling to at least one of the SRS transmissions or the PUSCH transmission based on at least one of a transmission type, symbol number, symbol location, or allocated power of the SRS transmissions or PUSCH transmission, wherein:
  - the determination is also based on a power change condition involving symbols in the first CC being satisfied; and
  - the power change condition involves a power difference between any two symbols of: an SRS transmission of the first type, an SRS transmission of the second type, a shortened PUSCH, or an empty symbol, being less than or equal to a threshold power difference; and
- transmitting at least one of the PUSCH or SRS in accordance with the determination, wherein the SRS transmission is scheduled for transmission in the first CC using a first radio frequency (RF) chain and the PUSCH transmission is scheduled for transmission in the second CC also using the first RF chain.

14. The method of claim 13, wherein the threshold power difference is determined based on at least one of: a capability of the UE, a predefined value, or radio resource control (RRC) signaling.

15. The method of claim 13, wherein the determination is:
- to not drop or power scale SRS transmission if the power change condition is satisfied and total allocated transmit power for a symbol or a group of symbols including the SRS transmissions is less than a transmit power threshold; or
- to drop or apply power scaling to at least one of the SRS transmission or PUSCH transmission if the power change condition is not satisfied and total allocated transmit power for a symbol or a group of symbols including the SRS transmissions does not exceed a transmit power threshold.

16. The method of claim 15, wherein:
- the determination is to drop or apply power scaling to at least one of the SRS transmission or a shortened PUSCH transmission in an effort to satisfy the power change condition based on a priority order; and
- the priority order is based on at least one of: a number of SRS transmissions of the first type, a number of SRS transmissions of the second type, a length of the shortened PUSCH transmission, or a type of uplink control information (UCI) carried in the shortened PUSCH transmission.

17. The method of claim 13, wherein the determination is to drop or apply power scaling to at least one of the SRS transmission or PUSCH transmission if:
- the power change condition is satisfied; and
- total allocated transmit power for a symbol or a group of symbols including the SRS transmissions exceeds a transmit power threshold.

18. The method of claim 17, wherein the determination is:
- to drop or apply power scaling to at least one of the SRS transmission or a shortened PUSCH transmission;
- to drop at least part of the PUSCH transmission if total allocated transmit power for a symbol or a group of symbols including the SRS transmissions is greater than a transmit power threshold; or
- to apply power scaling to at least one of the PUSCH transmission or SRS transmission based on a priority order.

19. The method of claim 18, wherein the determination is:
to drop the shortened PUSCH transmission if its length is less than a slot duration.

20. The method of claim 13, wherein the determination is to drop or apply power scaling to at least one of the SRS transmission or PUSCH transmission if:

the power change condition is not satisfied; and total allocated transmit power for a symbol or a group of symbols including the SRS transmissions exceeds a transmit power threshold.

21. The method of claim 20, wherein the determination is:

to drop or apply power scaling to at least one of the SRS transmission or a shortened PUSCH transmission in an effort to satisfy the power change condition based on a priority order, wherein the priority order is based on at least one of: a number of SRS transmissions of the first type, a number of SRS transmissions of the second type, a length of the shortened PUSCH transmission, or a type of uplink control information (UCI) carried in the shortened PUSCH transmission;

to drop at least part of the PUSCH transmission if total allocated transmit power for a symbol or a group of symbols including the SRS transmissions is greater than a transmit power threshold; or to apply power scaling to at least one of the PUSCH transmission or SRS transmission based on a priority order.

22. A method of wireless communications by a user equipment (UE) in a network, comprising:

receiving, from the network, signaling indicating, for a set of one or more uplink subframes, a first configuration for transmitting zero or more sounding reference signal (SRS) transmissions of a first type in a first component carrier (CC) and a second configuration for transmitting zero or more SRS transmissions of a second type in the first CC;

detecting, based on the configuration, a potential collision in a time domain of a subframe between one or more SRS transmissions in the first CC and a scheduled physical uplink shared channel (PUSCH) transmission in a second CC;

determining whether to drop or apply power scaling to at least one of the SRS transmissions or the PUSCH transmission based on at least one of a transmission type, symbol number, symbol location, or allocated power of the SRS transmissions or PUSCH transmission, wherein the determination is to apply power scaling to at least one of the SRS transmissions or the PUSCH transmission if a power difference between SRS transmission in a first CC and PUSCH transmission in a second CC is no less than a threshold power difference; and transmitting at least one of the PUSCH or SRS in accordance with the determination.

23. The method of claim 22, wherein the threshold power difference is determined based on at least one of: a capability of the UE, a predefined value, or radio resource control (RRC) signaling.

* * * * *